Figure 1:
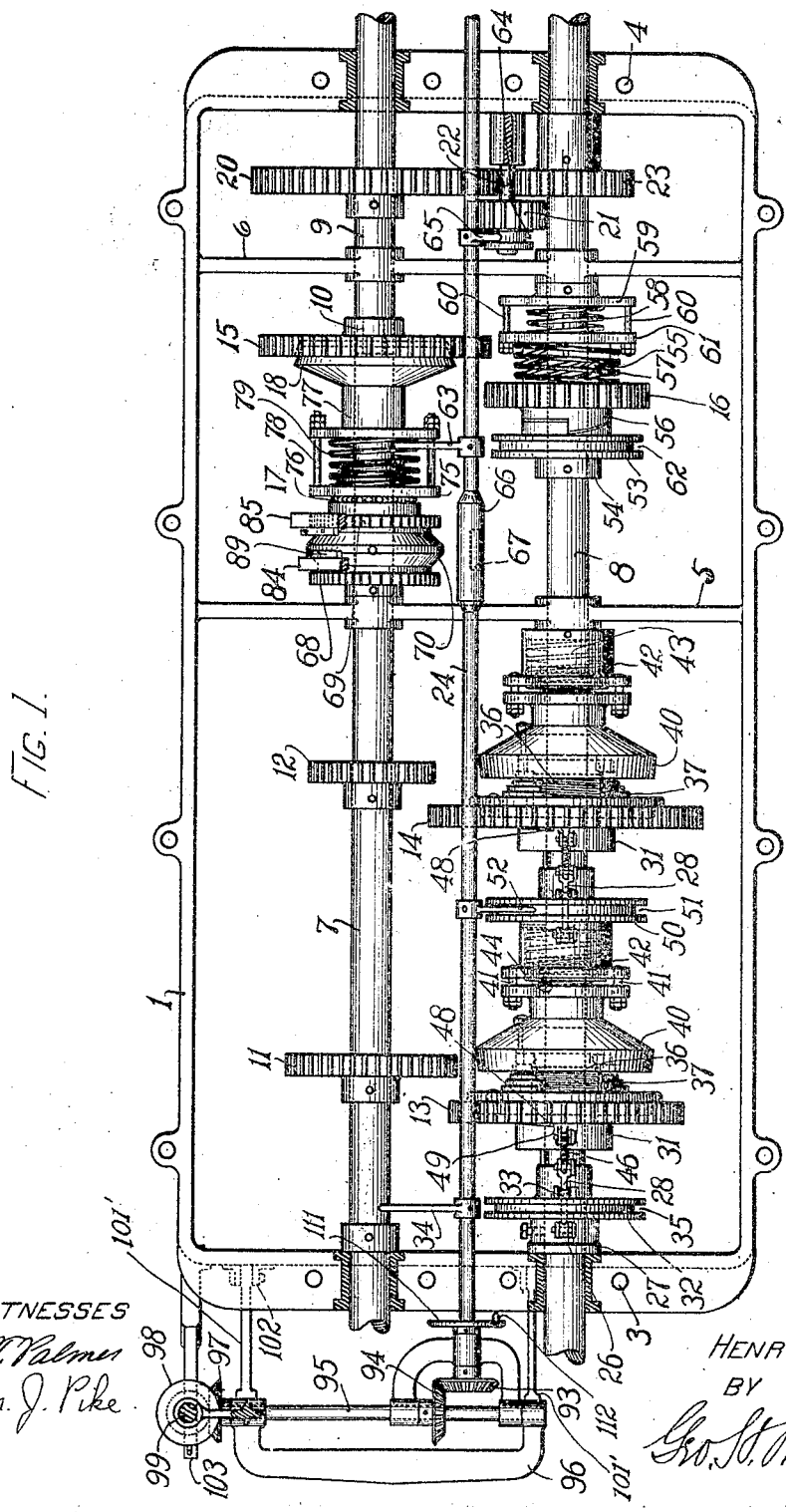

No. 860,649. PATENTED JULY 23, 1907.
H. O. FLETCHER.
POWER TRANSMISSION GEARING.
APPLICATION FILED JULY 30, 1906.

3 SHEETS—SHEET 1.

WITNESSES
A. T. Palmer
Wm. J. Pike

INVENTOR
HENRY O. FLETCHER
BY
Geo. St. Maxwell,
ATTY.

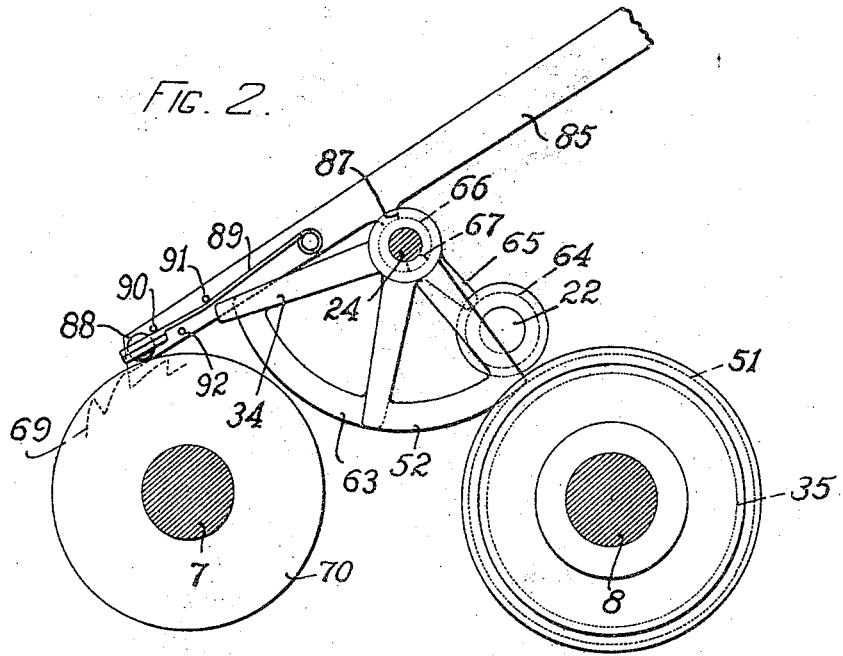
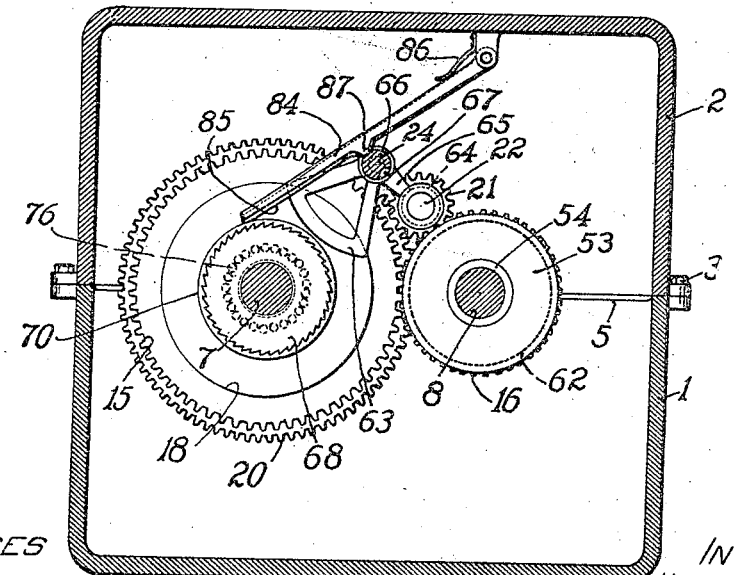

No. 860,649. PATENTED JULY 23, 1907.
H. O. FLETCHER.
POWER TRANSMISSION GEARING.
APPLICATION FILED JULY 30, 1906.
3 SHEETS—SHEET 3.
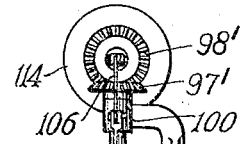
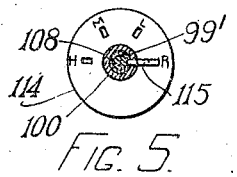
Fig. 5.
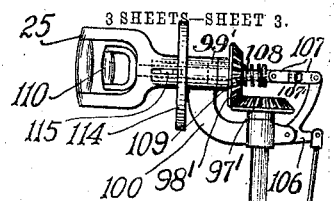
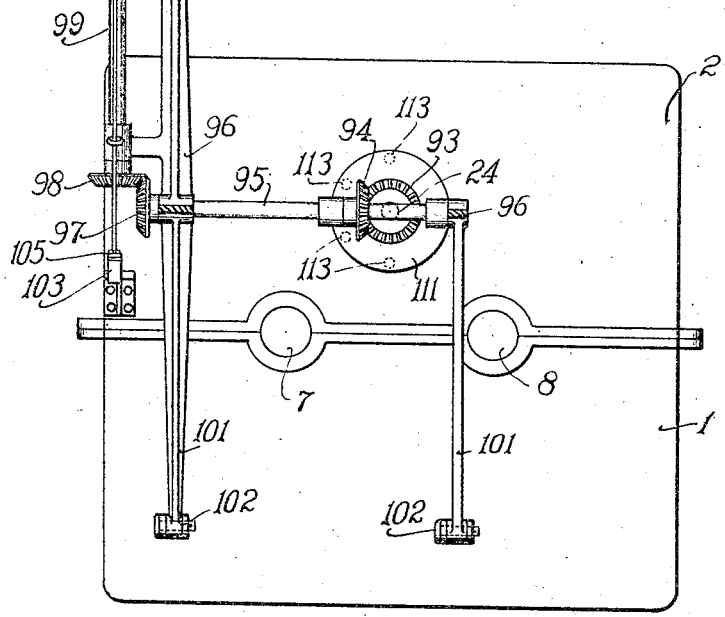
Fig. 4.
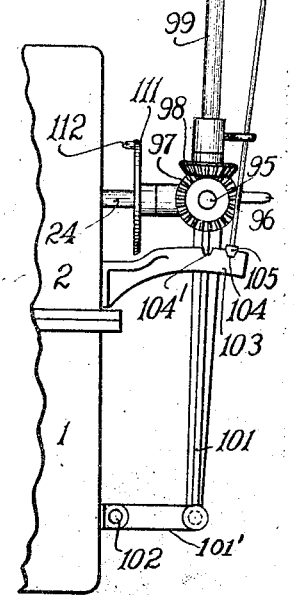
Fig. 6.
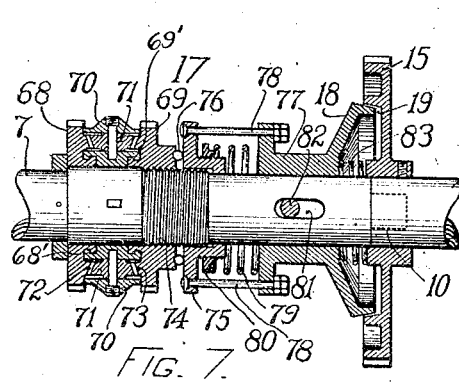
Fig. 7.
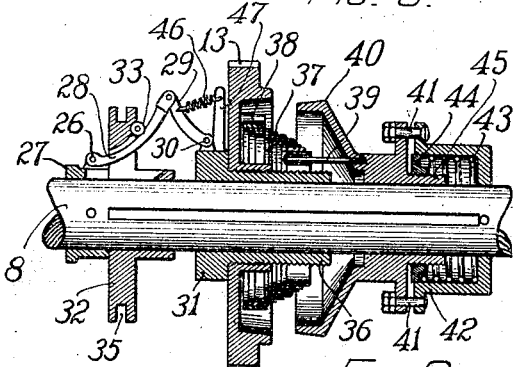
Fig. 8.
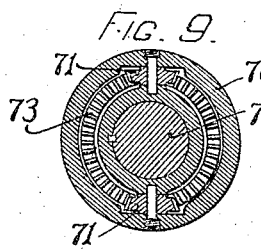
Fig. 9.
WITNESSES
A. T. Palmer
Wm. J. Pike
INVENTOR
HENRY O. FLETCHER
BY
Geo. H. Maxwell,
ATTY.

UNITED STATES PATENT OFFICE.

HENRY O. FLETCHER, OF HYDE PARK, MASSACHUSETTS.

POWER-TRANSMISSION GEARING.

No. 860,649.   Specification of Letters Patent.   Patented July 23, 1907.

Application filed July 30, 1906. Serial No. 328,286.

*To all whom it may concern:*

Be it known that I, HENRY O. FLETCHER, a citizen of the United States, and a resident of Hyde Park, in the county of Norfolk and State of Massachusetts, have invented an Improvement in Power-Transmission Gearing, of which the following description, in connection with accompanying drawings, is a specification, like letters on the drawings representing like parts.

My invention relates to power transmission gearing, and while adapted to general use in a variety of workshop situations, it is particularly intended for driving automobiles and the like, where the action is required to be simple to operate and understand, and yet must be positive and require little movement on the part of the operator.

In automobile mechanism it is usual to maintain the drive shaft at high speed, the connection being usually continuous through one line of shafting, and accordingly considerable shock and wear on the parts is experienced in changing the speed from the high speed drive shaft to a counter shaft or other mechanism and also a more or less complicated movement on the part of the operator is required.

Accordingly my mechanism utilizes the main shaft for the high speed driving of the vehicle and transmits the other speeds through a counter shaft, without shock, by means of automatically adjusting clutches and engaging gears, the coupling or shifting of the mechanism from one speed to another being accomplished by hand lever connections, which are so arranged that only one kind and amplitude of movement is required for all speeds and operations of the mechanism.

Further constructional details and the advantages of my invention will be pointed out more at length in the course of the following description, reference being had to the accompanying drawings, in which I have shown a preferred embodiment of my invention.

In the drawings, Figure 1 is a top plan view of the main operating parts of the apparatus, the top of the casing and connected parts being omitted; Fig. 2 is an enlarged cross-sectional view of the shipper rod and adjacent parts, showing their relation to the shaft and counter shaft; Fig. 3 is a cross section view similar to Fig. 2, showing further details of the mechanism; Fig. 4 is an end elevation looking at the operating mechanism from the left, Fig. 1, the connecting yoke of the operating lever being broken away for clearness of illustration; Fig. 5 is a front elevation of the dial and pointer; Fig. 6 is a view of the parts shown in Fig. 4 viewed in side elevation from the left Fig. 4; Figs. 7 and 8 are sectional details of the clutch mechanism at the main shaft and at the counter shaft respectively;
and Fig. 9 is a sectional end view of the detail of the clutch mechanism shown in Fig. 7.

Journaled in a suitable frame composed of a lower part 1 and an upper part 2 connected by screws as at 3, 4 and having transverse journal webs 5, 6 is a main drive shaft 7, a secondary shaft or counter shaft 8 and a work shaft 9, the main shaft 7 terminating at 10 in the end of the work shaft 9, the latter forming a bearing to keep the shaft 7 in proper alinement therewith. A medium speed gear 11 and a low speed gear 12 are fast on the shaft 7 to be engaged respectively at desired times by gears 13, 14 loose on the shaft 8, and the work shaft 9 has fast thereon a gear 15 to be engaged when desired by a gear 16 on the secondary shaft 8 for transmitting to said work shaft the medium or low speed of the above mentioned mechanism. An automatic clutch operating mechanism 17 serves to directly clutch the high speed drive shaft 7 with the work shaft 9, through any suitable form of clutch, a cone 18 being herein shown for fitting a recess 19 in the gear 15. The work shaft is also provided with a fixed gear 20 to be engaged by a reverse gear 21 slidingly mounted on a stub shaft 22 journaled in the frame and self-adapted to engage a gear 23 fast on the secondary shaft 8. All the aforesaid mechanism is controlled by the operation of a sliding rock shaft 24 actuated by a handle 25, all as will presently be described.

Referring now to the detailed construction of the clutch operating mechanisms, etc., pivoted at 26 in a collar 27 fast on the secondary shaft 8 is one or more pairs of links 28 of one or more toggles or knuckle joint levers (there being only one toggle as herein shown), whose opposite link 29 is pivoted at 30 to a sleeve 31 free to slide on said shaft 8 but keyed thereto to rotate therewith for driving said shaft, as will presently appear. The links 28 pass through a laterally shiftable grooved collar or actuator 32, being engaged on their outer surfaces by rolls 33 mounted in the right hand face of said collar, see Figs. 1 and 8, so that when an arm 34 of the rock shaft 24 occupies the groove 35 of said collar, longitudinal movement of said shaft 24 causes the collar to move to the right Fig. 1, and at once shifts and firmly holds the sleeve 31 so as to bring the gear 13, which is mounted on said sleeve, slightly into engagement with the medium speed gear 11 of the drive shaft. The gear 13 is in threaded engagement with the fine threaded end 36 of said sleeve 31 and is normally maintained in its left hand position as shown in Fig. 1, by a spring, herein shown as a flat convolute spring 37, which is secured to a pin 38 in a recess on the inner side of the gear 13 and at its opposite end to a pin 39 in a recess on the inner side of a clutch cone 40, which coöperates with the conical recess of the gear 13 to constitute a driving clutch for the secondary shaft 8. The clutch cone 40 is free to slide on the shaft 8 and is secured adjustably by bolts 41 to a flange collar 42 fast on said shaft 8, said collar 42 and clutch cone 40 being normally held apart by a spring 43 retained adjustably within said collar 42 by a nut 44 (see Fig. 8) threaded on a projecting end 45 of the clutch member 40. Thus when the sleeve 31 is shifted to the right Fig. 1 sufficiently to slightly engage the gear 13 with the gear 11 the fast rotary movement of the latter is immediately communicated to the gear 13, which instantly travels forward on the threads 36 against the resistance of spring 37 until it couples with the friction clutch member 40, which however does not take all the shock directly but itself yields forward to the right by reason of the spring 43. However, when the surface of the clutch member 40 comes in contact with the surface of flanged collar 42 the clutch member 40 becomes rigidly engaged with the gear 13. This construction entirely eliminates the objectionable shock commonly experienced by too quick an engagement of the clutch in running a usual automobile.

The reverse sliding movement of the rock shaft 24 operates through the arm 34 to shift the actuator 32 back to the left, whereupon the toggle links 28, 29 are broken or pulled outwardly by a spring 46 secured to said toggle links adjacent the knuckle at one end, said spring at its opposite end being secured to an arm 47 projecting from the sleeve 31. This operates to pull the sleeve 31 to the left and as soon as the gear 13 escapes from engagement with the gear 11 the convolute spring 37 unscrews the same until a lug 48 on the gear 13 engages a shoulder 49 on said sleeve, thereby holding the gear 13 free to be readily moved forward for the next coupling operation. The collar 42 serves the same purpose as the collar 27 for an exactly similar set of mechanism for coöperating with the low speed gear 12 of the drive shaft, an actuator 50 having its groove 51 engaged by an arm 52 of the shaft 24 for shifting the gear 14 and connected parts, which being exactly the same as already explained, will need no further description.

To couple the work shaft 9 with the counter shaft 8 I have provided a laterally shiftable actuator 53 normally held against a collar 54 fast on the shaft 8, having operating mechanism substantially the same as set forth in my Patent No. 826,022 dated July 17, 1906, said mechanism consisting of a hub 55 extending to the right from the gear 16, and a shouldered boss 56 extending to the left therefrom and all slidable longitudinally of the shaft 8 when actuated by the part 53, a spring 57 being provided for returning the gear, a spring 58 being interposed to hold the parts normally in retracted position as shown in Fig. 1, and the power being communicated from the shaft 8 through a flange 59 fast on said shaft and coupled by pins 60 to a flange 61 on the threaded hub 55, said flange 61 and hub 55 being keyed slidably to the shaft 8. The actuator 53 has a groove 62 to be engaged by an arm 63 on the rock shaft 24. So likewise the reverse gear 21, already explained, carries a groove 64 to be engaged by an arm 65 on said rock shaft 24. This arrangement allows the countershaft to be entirely disengaged from the power and work shafts when they are running at high speed.

The rock shaft 24, opposite the clutch mechanism 17 is provided with an enlargement 66 having a recess 67 in one side, located, when the parts are as shown in Fig. 1, to come between two ratchet wheels 68, 69 loose on the main drive shaft 7, see Figs. 1 and 7. Between said ratchet wheels is a smooth faced double cone ring 70, carrying small pinions 71 in mesh with annular gear teeth 72, 73 on said ratchet wheels 68, 69 respectively, said ring being slidably keyed to the shaft 7 and also connected to the ratchet wheels 68, 69 by flanges 6", 69' so as to be free to revolve on said flanges but compelled to slide longitudinally therewith. The ratchet wheel 69 is in threaded engagement with the drive shaft, as indicated at 74 and operates against an annular plate 75 (ball bearings 76 preferably being interposed) slidingly connected with the hub 77 of the conical clutch member 18 already mentioned, by bolts 78, being adjustable by nuts. A spring 79 is interposed between the hub 77 and the plate 75, being capable of adjustment by a nut 80. The hub of the clutch member 18 is slidingly mounted on the drive shaft but compelled to rotate therewith by means of a slot and pin connection, the slot being shown as in the shaft at 81, and the pin being shown at 82 as extending through the shaft and hub. The gear 15 has a conical recess 19 to receive the conical clutch member 18.

Arranged above the two ratchet wheels 68, 69 are pawls 84, 85 adapted to engage with one or the other of said ratchet wheels according to the position of the recess 67 in the enlargement 66 of the rock shaft 24. Said pawls are normally depressed by springs 86, and excepting when permitted to fall by the movement of the recess 67 beneath lugs 87 on said pawls, the latter are maintained constantly out of engagement with the ratchet wheels. Each pawl carries on its inner side a roll 88 preferably slidingly supported by a spring 89, whose position is determined by stops 90, 91, 92, projecting from the adjacent pawl as clearly shown in Fig. 2. Thus when the rock shaft 24 is shifted and rocked to the proper position to bring its recess 67 beneath one or the other of the pawls, said pawl instantly drops into engagement with the corresponding ratchet wheel, whose rotation is thereby stopped, which causes the ratchet wheels to be shifted in one direction or the other on the main shaft by reason of the threaded engagement at 74. If the ratchet wheel 69 is stopped by the engagement therewith of its pawl 85, the result is that said ratchet wheel is caused to travel along the thread 74 to the right of the shaft, which operates to clutch the main shaft 7 with the work shaft 9 by the engagement of the clutch member 18 with the recess 19 of the gear 15. If on the other hand, the ratchet wheel 68 is engaged by its pawl 84 so that it is thereby stopped, the result is that the epicyclic gears 71, which are positively driven by the engagement of their ring support with the drive shaft, operates to give the ratchet wheel 69 (which acts as a nut with relation to the shaft 7) a reverse movement, thereby moving the same back to the left Fig. 1, so as to release the clutch member 18 from driving engagement with the gear 15, the spring 83 being interposed to hold said clutch member out of engagement. As the ratchet wheels 68 and 69 move laterally in either direction, the inclined surface of the ring 70 which is adjacent to the lower or working pawl, engages the roll 88 carried by said pawl and gradually lifts the pawl out of engagement with the ratchet wheel, so that as the ratchet wheel rotates the limit of its movement the pawl becomes entirely disengaged and as soon as the pawl escapes from engagement with the teeth of its ratchet wheel the spring support of said roll 88 serves to raise the pawl still further, so that there is no danger of its accidentally catching the teeth of its ratchet wheel.

Referring now more particularly to Figs. 2—6, which show the details of the shipper rod 24, operating handle and various connections, it will be seen that the rock shaft arm 63 is in the form of a sector, see Fig. 3, and that the arm 52 is also in the form of a similar sector, see Fig. 2, while the arms 34, 65 simply project forwardly the proper distance to engage at one point their respective grooves. The result of this construction is that when the arm 34 for instance is turned so as to occupy its groove 35, the sector arm 63 will simultaneously occupy its groove 62, thereby operating to simultaneously engage the gear 13 with the gear 11 and the gear 16 with the gear 15 when the rock shaft 24 is caused to slide longitudinally to the right. On the other hand, if instead of stopping the rotation of the shaft 24 at the point where the arm 34 occupies its groove 35, said shaft is caused to rock still further, the result is that the arm 34 passes on out of groove 35 and the arm 52 is then caused to occupy its groove 51, but inasmuch as the arm 63 is in the form of a sector, it still occupies its groove 62, so that the subsequent longitudinal shifting of the shaft 24 produces a simultaneous engagement of the gears 14 and 12 and of the gears 16 and 15. If instead of this operation, the rock shaft 24 is turned still further, the segmental arm 63 will pass out of its groove 62, the arm 52 still retaining its position in its groove 51 however, because of the fact that it has also a segmental arm, and the short arm 65 thereupon occupies its groove 64, so that the reverse movement of the work shaft 9 takes place at the same time with the coupling of the low speed gear 12 with the counter shaft gear 14.

At its outer end the rock shaft 24 is provided with a gear 93 in mesh with a beveled gear 94 fast on a transverse shaft 95 journaled in a lever 96 and provided at its outer end with a beveled gear 97 meshing with a gear 98 on a vertical shaft 99 journaled in the arm 100 projecting from lever 96 and carrying at its upper end a bevel gear 97′ in mesh with a bevel gear 98′ on a stub shaft 99′ journaled in an arm 100 extending outwardly from the yoke 96 and provided at its outer end with the handle 25. The lever 96 has depending portions 101 pivotally connected to links 101′ which are pivoted to the frame of the machine at 102 so that all the external operating parts may be swung toward and from the rest of the machine, thereby moving the shaft 24 longitudinally.

To lock the parts in desired longitudinal adjustment I have provided a segmental bracket 103 projecting rigidly from the end of the frame of the machine and provided with notches 104, 104′ adapted to be engaged by a dog 105 extending downwardly from a bell crank lever 106 pivoted to the lever 96 and connected at its upper end by links 107 swiveled at 107′ to a small shaft 108 normally held forward by a spring 109 and extending through the stub shaft 99′ toward the handle 25, where it is provided with a supplemental handle 110, by which it may be operated in an obvious manner.

To make it impossible to shift the rock shaft 24 improperly to engage a gear, I have provided means requiring the operator to push forward upon the handle 25 so as to move the shaft 24 always to its extreme left position Fig. 1 before he can rock said shaft, said means being herein shown as consisting of a plate 111 fast on said rock shaft at the outer end of the frame and provided with a pin 112 to engage one or another of several holes 113 provided at the proper distances apart in the end of the frame of the machine. Thus in order to move the shaft 24 longitudinally to the right Fig. 1, it is necessary that the pin 112 shall first be brought into accurate alinement with the proper hole 113 before said shaft can possibly be slid to the right. As this mechanism is, in an automobile, away from the side of the operator, I provide on the bracket 100 of the lever 96 a dial 114 having notches corresponding to the holes 113 and conveniently marked to indicate the positions of high speed, medium speed, low speed and reverse, said notches being engaged by a pointer or lug 115 projecting outwardly from the stub shaft 108.

In use the operator grasps the handle 25, which, in the case of an automobile, projects outwardly in front of the driver, and first pulls back with the fingers upon the auxiliary handle 110 so as to move the pointer 115 out of engagement with the dial 114 and also so as to unlock the dog 105 from the bracket 104. He then simply turns the handle to the point on the dial which indicates the resulting movement desired and then pulls back the required distance. This swings the lever 96 and the various shafts connected therewith toward the frame of the apparatus, thereby longitudinally moving the shaft 24 and at the same time shifting the gear and clutch mechanism with which the arm or arms of said shaft may be engaged.

It will be seen that there is invariably the same back and forth reciprocation of the handle coupled with a wrist movement or rocking movement, and that provided the operator turns the index pointer to the right place, no mistake can result. The index pointer cannot be turned unless the rock shaft has first been pulled out to the left Fig. 1, at which time it is perfectly safe to rock the rock shaft. Also the shipper arms are so arranged that they cause the simultaneous engagement and movement of the parts which must be simultaneously moved, and when so engaged the other arms cannot engage the remaining parts which at that time should not be moved.

By my mechanism the work shaft 9 can be driven at high speed by coupling it directly with the main shaft, in which case the secondary shaft 8 is entirely out of engagement, or said work shaft may be coupled with the secondary shaft either at medium speed, low speed or reverse as desired. Before it can be thus coupled, the clutching mechanism thereof to the main shaft is automatically thrown out of clutching engagement. Also when the work shaft is being driven by the secondary shaft 8 the mechanism is so arranged that it cannot be coupled directly with the main shaft without first throwing all the gears of the secondary shaft out of mesh with the gears of the main shaft and work shaft.

It will be understood that although I have herein shown cone clutches, other kinds of clutching mechanism may be employed; and also it will be understood that various other changes in form and arrangement of parts may be resorted to, without departing from the spirit and scope of my invention.

Having described my invention, what I claim as new and desire to secure by Letters Patent is, 1. An apparatus of the kind described, comprising a main shaft, secondary shaft and a work shaft, coöperating mechanism on said main shaft and secondary shaft for driving the latter by the former either at medium speed or at low speed as desired, coöperating means on said secondary shaft and said work shaft for driving the latter by the former, and shipping mechanism provided with means for simultaneously coupling together the work shaft and secondary shaft and also the main shaft and the secondary shaft at either speed desired.

2. An apparatus of the kind described, comprising a main shaft, secondary shaft and a work shaft, coöperating mechanism on said main shaft and secondary shaft for driving the latter by the former either at medium speed or at low speed as desired, coöperating means on said secondary shaft and said work shaft for driving the latter by the former, shipping mechanism provided with means for simultaneously coupling together the work shaft and secondary shaft and also the main shaft and the secondary shaft at either speed desired, and means constructed and operating to disconnect said work shaft and secondary shaft whenever the latter is disconnected from the main shaft.

3. An apparatus of the kind described, comprising a main shaft, a work shaft in line therewith and a secondary shaft parallel to said other two shafts, and three sets of connecting mechanisms for high speed, medium speed and low speed or reverse respectively, each set including a laterally shiftable portion, and, combined with a single shipping rod in the form of a rock shaft having longitudinal movement, projecting arms carried and operated by said rock shaft to engage directly said respective mechanisms for causing said lateral shifting movement thereof, and a swinging actuator constructed and arranged for both rocking and moving longitudinally said rock shaft.

4. An apparatus of the kind described, comprising two shafts, a collar fast on one of said shafts, a longitudinally movable sleeve adjacent said collar, said sleeve having a threaded portion, a gear having threaded engagement with said threaded portion, a clutch member on said shaft to coöperate with said gear, a toggle between said collar and said sleeve, a laterally shiftable member for operating said toggle to shift said sleeve, and a second gear normally out of mesh with the first mentioned gear and mounted on the other shaft, said two gears being brought into mesh with each other by the shifting movement of said toggle.

5. An apparatus of the kind described, comprising a main drive shaft, a secondary shaft, a collar fast on the latter, a longitudinally movable sleeve adjacent said collar, said sleeve having a threaded portion, a gear having threaded engagement with said threaded portion, a clutch member on said shaft to coöperate with said gear, a toggle between said collar and said sleeve, a laterally shiftable member for operating said toggle to separate said sleeve from said collar, a gear on said drive shaft normally out of mesh with the gear on said secondary shaft, said two gears being brought into mesh with each other by the separating movement of said toggle, and yielding means for receiving the clutching impact of the engagement of said threaded gear with said clutch member.

6. An apparatus of the kind described, comprising a main drive shaft, a secondary shaft, a collar fast on the latter, a longitudinally movable sleeve adjacent said collar, said sleeve having a threaded portion, a gear having threaded engagement with said threaded portion, a clutch member on said shaft to coöperate with said gear, a toggle between said collar and said sleeve, a laterally shiftable member for operating said toggle to separate said sleeve from said collar, a gear on said drive shaft normally out of mesh with the gear on said secondary shaft, said two gears being brought into mesh with each other by the separating movement of said toggle, yielding means for receiving the clutching impact of the engagement of said threaded gear with said clutch member, and automatic means between said clutch member and said threaded gear for automatically unscrewing the latter from engagement with said clutch member when said two gears are separated.

7. An apparatus of the kind described, comprising a main drive shaft, a secondary shaft, a collar fast on the latter, a longitudinally movable sleeve adjacent said collar, said sleeve having a threaded portion, a gear having threaded engagement with said threaded portion, a clutch member on said shaft to coöperate with said gear, a toggle between said collar and said sleeve, a laterally shiftable member for operating said toggle to separate said sleeve from said collar, a gear on said drive shaft normally out of mesh with the gear on said secondary shaft, said two gears being brought into mesh with each other by the separating movement of said toggle, yielding means for receiving the clutching impact of the engagement of said threaded gear with said clutch member, and means for regulating the tension of said yielding means.

8. An apparatus of the kind described, comprising a drive shaft, a secondary shaft and clutching mechanism for connecting the two in driving relation, including a gear fast on one shaft, a sleeve mounted to rotate with the other shaft and freely movable longitudinally thereof, said sleeve having a threaded portion, a gear mounted to travel on said threaded portion for engagement with said fixed gear, a clutch member mounted coaxially of said threaded portion to be engaged by its gear, and yielding means for receiving the clutching impact.

9. An apparatus of the kind described, comprising a drive shaft, a secondary shaft and clutching mechanism for connecting the two in driving relation, including a gear fast on one shaft, a sleeve mounted to rotate with the other shaft and freely movable longitudinally thereof, said sleeve having a threaded portion provided with fine threads, a gear mounted to travel on said threaded portion for engagement with said fixed gear, and a clutch member mounted coaxially of said threaded portion to be engaged by its gear, said fine threads affording slow lateral movement with relation to said sleeve and permitting a large circumferential travel of the engaging gear before coming into clutching contact with said clutching member.

In testimony whereof, I have signed my name to this specification, in the presence of two subscribing witnesses.

HENRY O. FLETCHER.

Witnesses:
WM. J. PIKE,
M. J. SPALDING.